(12) United States Patent
Van Polen

(10) Patent No.: US 9,099,699 B2
(45) Date of Patent: Aug. 4, 2015

(54) CONSIST HAVING SHARED ELECTROLYTE TANKS

(71) Applicant: Electro-Motive Diesel, Inc., LaGrange, IL (US)

(72) Inventor: Jerry Van Polen, Oak Park, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 0 days.

(21) Appl. No.: 14/477,349

(22) Filed: Sep. 4, 2014

(65) Prior Publication Data

US 2014/0370335 A1    Dec. 18, 2014

Related U.S. Application Data

(62) Division of application No. 13/404,966, filed on Feb. 24, 2012, now Pat. No. 8,857,345.

(51) Int. Cl.

| *H01M 2/38* | (2006.01) |
|---|---|
| *H01M 8/04* | (2006.01) |
| *B61C 3/02* | (2006.01) |
| *H01M 10/42* | (2006.01) |
| *H01M 2/40* | (2006.01) |
| *H01M 8/18* | (2006.01) |

(52) U.S. Cl.
CPC ............ *H01M 8/04186* (2013.01); *B61C 3/02* (2013.01); *H01M 2/38* (2013.01); *H01M 2/40* (2013.01); *H01M 8/04201* (2013.01); *H01M 8/188* (2013.01); *H01M 10/4214* (2013.01); *Y02T 30/12* (2013.01)

(58) Field of Classification Search
CPC ............ B61C 3/00; H01M 2/38; H01M 2/36; H01M 2/40; B60L 7/12; B60L 7/14; B60L 7/22; B60L 9/02; B60L 9/16; B60L 11/14; B60L 11/16
USPC .......................... 104/26.05, 35, 49, 50, 51, 60
See application file for complete search history.

(56) References Cited

U.S. PATENT DOCUMENTS

| 3,877,387 | A   | * | 4/1975  | Kasai et al. ...................... 105/49 |
| 4,754,777 | A   | * | 7/1988  | Frode ............................. 137/261 |
| 6,591,758 | B2  | * | 7/2003  | Kumar ............................ 105/35 |
| 6,764,785 | B2  | * | 7/2004  | Colborn et al. ............... 429/430 |
| 7,661,370 | B2  |   | 2/2010  | Pike et al. |
| 7,820,321 | B2  | * | 10/2010 | Horne et al. .................. 429/149 |
| 8,413,589 | B2  |   | 4/2013  | Iden |

(Continued)

FOREIGN PATENT DOCUMENTS

| EP | 2 077 599 A1 | 7/2009 |
| WO | WO 2009/156259 A1 | 12/2009 |

*Primary Examiner* — Jason C Smith
(74) *Attorney, Agent, or Firm* — Finnegan, Henderson, Farabow, Garrett & Dunner, LLP

(57) ABSTRACT

A system for distributing energy among a plurality of power consumers may include a plurality of reaction cells configured to receive electrolytes and provide electric power. The system may also include a first tank configured to contain a supply of fluid including positively charged electrolytes and a second tank configured to contain a supply of fluid including negatively charged electrolytes. The system may also include at least one pump configured to pump fluid among the plurality of reaction cells and the first and second tanks. The system may include a controller configured to control operation of the at least one pump based on a desired power supply to at least one of the plurality of power consumers.

10 Claims, 4 Drawing Sheets

(56) References Cited

U.S. PATENT DOCUMENTS

| | | | |
|---|---|---|---|
| 2003/0233959 A1* | 12/2003 | Kumar | 105/26.05 |
| 2005/0206331 A1* | 9/2005 | Donnelly | 318/52 |
| 2005/0269995 A1* | 12/2005 | Donnelly et al. | 320/150 |
| 2006/0061307 A1* | 3/2006 | Donnelly | 318/108 |
| 2006/0076171 A1* | 4/2006 | Donnelly et al. | 180/65.2 |
| 2006/0091832 A1* | 5/2006 | Donnelly et al. | 318/108 |
| 2008/0264291 A1* | 10/2008 | Pike et al. | 105/50 |
| 2010/0212539 A1* | 8/2010 | Iden | 105/35 |
| 2011/0117411 A1 | 5/2011 | Horne et al. | |
| 2013/0190956 A1* | 7/2013 | Zhamu et al. | 701/22 |
| 2013/0220163 A1* | 8/2013 | Polen | 105/49 |
| 2013/0220164 A1* | 8/2013 | Polen | 105/50 |
| 2013/0269566 A1* | 10/2013 | Van Polen | 105/50 |

* cited by examiner

CONSIST HAVING SHARED ELECTROLYTE TANKS

This is a divisional of application Ser. No. 13/404,966, filed Feb. 24, 2012, which is incorporated herein by reference in its entirety.

TECHNICAL FIELD

The present disclosure relates generally to a system and method for distribution of energy and, more particularly, to a system and method for distribution of electric energy among a plurality of energy consumers of a consist.

BACKGROUND

As a result of rising fuel costs and emissions concerns, the transportation industries are looking for cost-efficient and environmentally friendly alternatives for powering vehicles. In particular, this has resulted in the development of electrically powered locomotives, including hybrid and electric locomotives.

In traditional consist arrangements, the power storage and control of each locomotive may be controlled separately. In traditional consists including hybrid and/or electric locomotives, each locomotive may be responsible for providing and controlling its own battery power. Requiring each locomotive to manage its own battery control may have several limitations. For example, where the sum of the maximum power requirements of each locomotive in a consist exceeds the maximum power requirements of the consist, the locomotives must have sufficient power capacity to meet their individual maximum requirements, as power cannot be shared among the locomotives. Furthermore, in consists in which a locomotive has the ability to generate more power than it requires (e.g., from regenerative braking), that excess power cannot be transferred to other locomotives that may be able to use that power.

One solution for energy management of hybrid locomotives is described in U.S. Pat. No. 6,591,758 B2 ("the '758 patent"). The '758 patent is directed to a hybrid energy locomotive system having an energy storage and regeneration system that may purportedly be located in a separate energy tender vehicle. According to the '758 patent, the energy storage and regeneration system captures dynamic braking energy, excess motor energy, and externally supplied energy and stores the captured energy in one or more energy storage subsystems, including a flywheel, a battery, an ultra-capacitor, or a combination of such subsystems. The energy storage and regeneration system can be located in a separate energy tender vehicle, which is optionally equipped with traction motors. An energy management system is responsive to power storage and power transfer parameters, including data indicative of present and future track profile information, to determine present and future electrical energy storage and supply requirements. The energy management system controls the storage and regeneration of energy accordingly.

Although the system and method disclosed in the '758 patent may store and regenerate energy on a locomotive, the system and method disclosed in the '758 patent may still suffer from a number of possible drawbacks. For example, the system and method disclosed in the '758 patent requires that each locomotive has its own designated energy storage system, which prevents the free transfer of energy among locomotives in a consist. For example, the system disclosed requires a consist using this system to power additional controls and carry additional components. Therefore, it may be desirable to provide an energy distribution system and method that enables transfer of energy among locomotives in a consist.

The presently disclosed systems and methods may mitigate or overcome one or more of the above-noted drawbacks and/or other problems in the art.

SUMMARY

In one aspect, the present disclosure is directed to a system for distributing energy among a plurality of power consumers. The system may include a plurality of reaction cells configured to receive electrolytes and provide electric power. The system may also include a first tank configured to contain a supply of fluid including positively charged electrolytes and a second tank configured to contain a supply of fluid including negatively charged electrolytes. The system may also include at least one pump configured to pump fluid among the plurality of reaction cells and the first and second tanks. The system may include a controller configured to control operation of the at least one pump based on a desired power supply to at least one of the plurality of power consumers.

According to another aspect, the present disclosure is directed to a method of distributing energy among a plurality of power consumers sharing at least one pair of tanks configured to contain electrolytes, wherein at least one of the power consumers is associated with a reaction cell and a pair of pumps configured to pump the electrolytes between the pair of tanks and the reaction cell. The method may include receiving one or more signals indicative of a power condition of at least one of the plurality of power consumers. The method may also include determining a desired power supply for the at least one of the plurality of power consumers based on the signals indicative of the power condition of the at least one power consumer. The method may also include receiving one or more signals indicative of the level of charge of the electrolytes stored in the electrolyte tanks. The method may include determining a flow rate for a first pump of the pair of pumps based on the desired power supply, and controlling the first pump based on the determined flow rate.

According to yet another aspect, the present disclosure is directed to a consist. The consist may include a plurality of locomotives configured to propel the consist. The consist may also include a plurality of reaction cells associated with the plurality of locomotives such that each of the locomotives is at least partially powered by one of the reaction cells. The reaction cells may be configured to receive electrolytes and provide electric power. The consist may also include a first tank configured to contain a supply of fluid including positively charged electrolytes and a second tank configured to contain a supply of fluid including negatively charged electrolytes. The consist may also include at least one pump configured to pump fluid among the plurality of reaction cells and the first and second tanks. The consist may also include a controller configured to control operation of the at least one pump based on a desired power supply to at least one of the plurality of locomotives.

DETAILED DESCRIPTION

Figure 1:
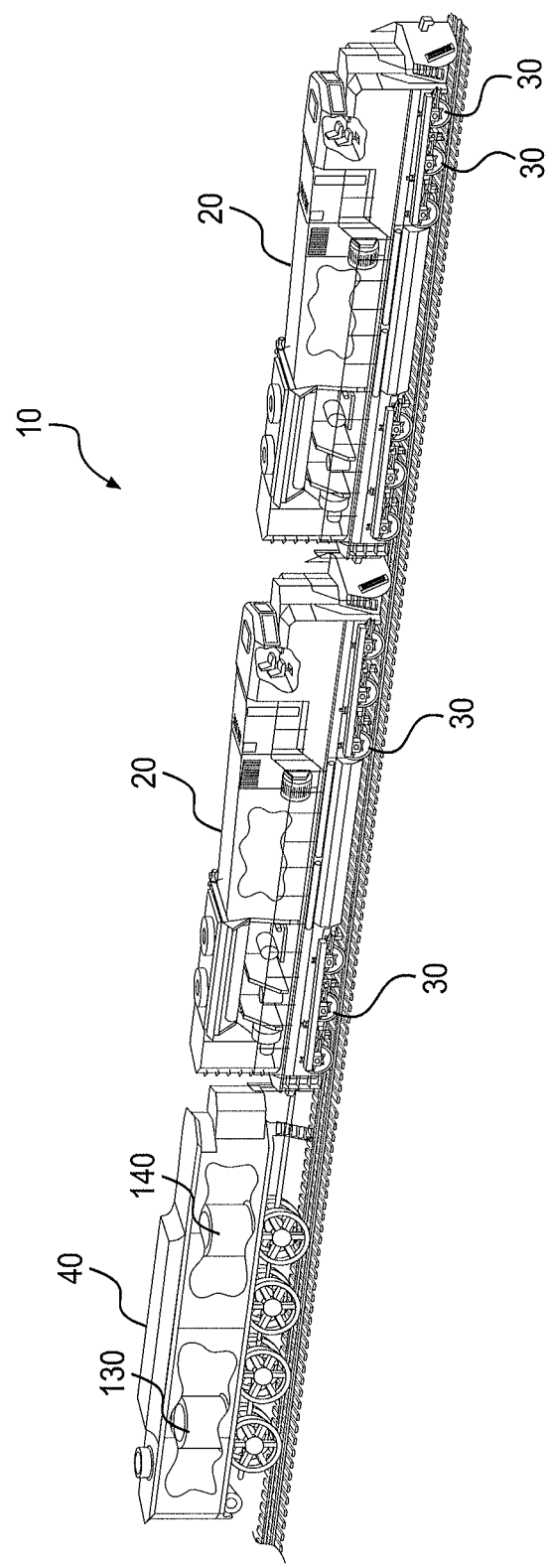
FIG. 1 shows a perspective view of an exemplary embodiment of a consist.

FIG. 1 is a perspective view of an exemplary embodiment of a consist 10 including a plurality of locomotives 20. Although not shown in FIG. 1, exemplary consist 10 may include more than two locomotives 20. Additionally, consist 10 may also include a variety of other railroad cars, such as, for example, freight cars, tender cars, and/or passenger cars and may employ different arrangements of the cars and locomotives to suit the particular use of consist 10. For example, the exemplary embodiment of consist shown in FIG. 1 includes a tender car 40.

One or more of locomotives 20 may include one or more traction motors 30 configured to provide force for propelling consist 10. Consist 10 may also include an energy distribution system 50 (see, e.g., FIG. 2) configured to supply and/or capture energy associated with operation of consist 10. For example, when one or more of traction motors 30 supplies force for propelling consist 10, traction motors 30 provide a load on energy distribution system 50. According to some embodiments, one or more of traction motors 30 may be configured to operate as electric generators, for example, when traction motors 30 act to reduce the speed of consist 10 via regenerative braking. According to such embodiments, when traction motors 30 act to reduce the speed of consist 10, some embodiments of energy distribution system 50 may be configured to store and/or divert energy supplied by traction motors 30 for use at a later time and/or by other parts of consist 10 (e.g., by other locomotives 20).

Figure 2:
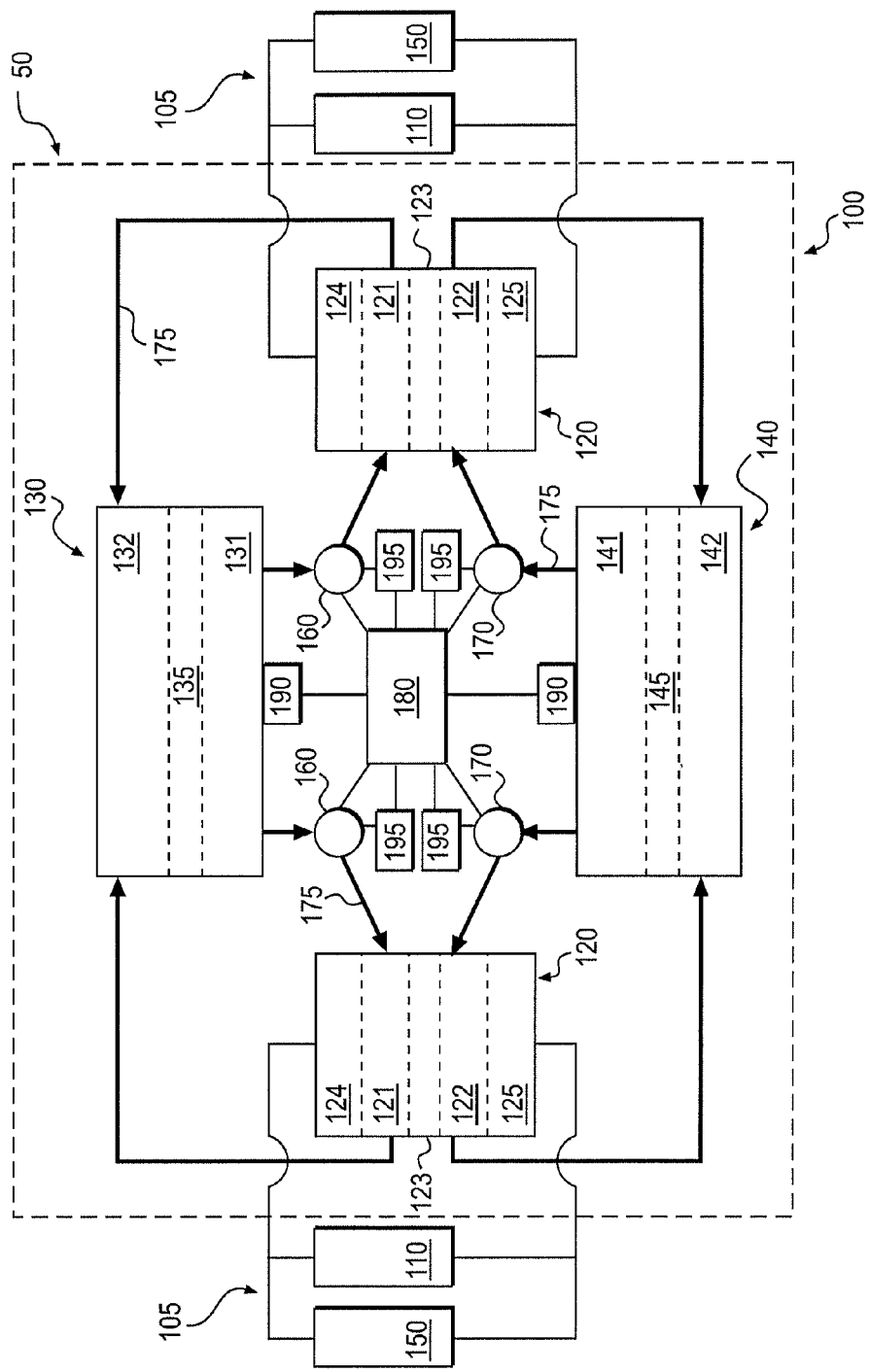
FIG. 2 is a block diagram of an exemplary embodiment of a flow battery system.

FIG. 2 is a block diagram of an exemplary embodiment of an energy distribution system 50. As shown in FIG. 2, exemplary energy distribution system 50 includes a flow battery system 100. Exemplary flow battery system 100 shown in FIG. 2 is configured for use with a plurality of power consumers 105, such as loads 110. For example, loads 110 may represent the loads on energy distribution system 50 when traction motors 30 operate to propel consist 10. The exemplary energy distribution system shown in FIG. 2 is configured for use with two loads 110, but it is contemplated that exemplary flow battery system 100 can be modified to accommodate more loads 110.

As shown in FIG. 2, flow battery system 100 may include a plurality of reaction cells 120. Each reaction cell 120 may be configured to receive electrolytes and provide electric power. Each reaction cell 120 may include two half-cells 121 and 122, which are separated by a membrane 123. Flow battery system 100 may operate to provide energy to loads 110 by a chemical reaction caused by two electrolytes separated by membrane 123. For example, the two electrolytes, which act as energy carriers, may each be delivered into one of two half-cells 121 and 122. For example, half-cell 121 may receive positively charged electrolytes, and half-cell 122 may receive negatively charged electrolytes. Membrane 123 may prevent the two types of electrolytes from mixing with one another, but may allow selected ions to pass through to complete a reduction-oxidation ("redox") reaction, which causes electricity to flow through reaction cell 120, thereby creating a voltage difference between a pair of electrodes 124 and 125 associated with respective half-cells 121 and 122.

In the exemplary embodiment shown in FIG. 2, to deliver power to loads 110, the chemical energy contained in the electrolytes may be drawn from electrodes 124 and 125, which are supplied with electric power from reaction cell 120. Each load 110 is electrically connected to electrodes 124 and 125 to receive power from reaction cell 120. According to some embodiments, the power consumers 105 may be configured to charge the electrolytes in half-cells 121 and 122. For example, to charge the electrolytes, energy distribution system 50 may supply electrical energy to half-cells 121 and 122, which may cause a chemical reduction reaction in one electrolyte mixture and an oxidation reaction in the other electrolyte mixture of respective half-cells 121 and 122. For example, FIG. 2 shows a power consumer 105 that acts as a power source 150 connected to electrodes 124 and 125, with power source 150 providing power to charge the electrolytes. While load 110 and power source 150 are shown as two separate elements in FIG. 2, it will be apparent that a single device or system can operate as both a load and as a power source. For example, according to some embodiments, one or more of exemplary traction motors 30 shown in FIG. 1 may be able to operate as both an electrical load when using power to propel consist 10 and as a power supplier when traction motor 30 acts as a generator to slow the speed of consist 10 via, for example, regenerative braking.

The electrolytes may contain one or more dissolved electroactive species, and the two electrolytes may include positively charged electrolytes and negatively charged electrolytes, respectively. For example, the electrolytes may include vanadium ions in different oxidation states. Alternatively, the electrolytes may include polysulfide bromide, uranium, zinc-cerium, or zinc-bromide. There are a variety of other chemical compounds and combinations known in the art that are capable of acting as electroactive species, and it is contemplated that the electrolytes used in exemplary flow battery system 100 may include one or more of those compounds and combinations.

Exemplary flow battery system 100 may include at least a first tank 130 configured to contain a supply of fluid including positively charged electrolytes and a second tank 140 configured to contain a supply of fluid including negatively charged electrolytes. Electrolyte tanks 130 and 140 may be located separately from reaction cells 120 and may be configured to supply the stored electrolytes to reaction cells 120. For example, first electrolyte tank 130 may store positively charged electrolytes, and second electrolyte tank 140 may store negatively charged electrolytes. For example, first electrolyte tank 130 may store cathode electrolytes ("catholytes"), and second electrolyte tank 140 may store anode electrolytes ("anolytes"). In this exemplary configuration, first electrolyte tank 130 may provide positively charged electrolytes for half-cell 121, and second electrolyte tank 140 may provide negatively charged electrolytes for half-cell 122.

According to some embodiments, first electrolyte tank 130 may be configured to provide positively charged electrolytes for a plurality of half-cells 121. Similarly, second electrolyte tank 140 may be configured to provide negatively charged electrolytes for a plurality of half-cells 122. In this manner, electrolyte tanks 130 and 140 may supply electrolytes for multiple reaction cells 120 to power multiple loads 110. Likewise, electrolyte tanks 130 and 140 may supply electrolytes for multiple reaction cells 120 to charge electrolytes using a plurality of power sources 150, for example, each associated with a respective reaction cell 120.

According to some embodiments, one or more of electrolyte tanks 130 and 140 may be configured to store both charged and uncharged electrolytes. For example, first electrolyte tank 130 may include a first tank separator 135 configured to prevent charged electrolytes from mixing with uncharged electrolytes. In the same manner, second electrolyte tank 140 may include a second tank separator 145. For example, in FIG. 2, charged electrolytes may be stored in a tank portion 131 of electrolyte tank 130, and discharged electrolytes may be stored in a tank portion 132 of electrolyte tank 130. Similarly, charged electrolytes may be stored in a tank portion 141 of electrolyte tank 140, and discharged electrolytes may be stored in a tank portion 142 of electrolyte tank 140. In some embodiments, the relative charge of the electrolytes stored in portions 131, 132, 141, and 142 of electrolyte tanks 130 and 140 vary during operation of energy distribution system 50. That is, portions 132 and 142 may start out storing discharged electrolytes, but through the course of operation of energy distribution system 50, portions 132 and 142 may store electrolytes that have been charged via, for example, regenerative braking of traction motors 30.

Exemplary tank separators 135 and 145 may be movable and/or able to travel within electrolyte tanks 130 and 140, respectively, to account for changing volumes of charged and discharged electrolytes as flow battery system 100 operates to charge or discharge the electrolytes. According to some embodiments, tank separators 135 and 145 may be buoyant. Alternatively, or additionally, tank separators 135 and 145 may include flow passages configured to be opened and closed to allow electrolytes to travel through separators 135 and 145 to the other side of electrolyte tanks 130 and 140. Other configurations of tank separators 135 and 145 will be apparent.

Figure 3:
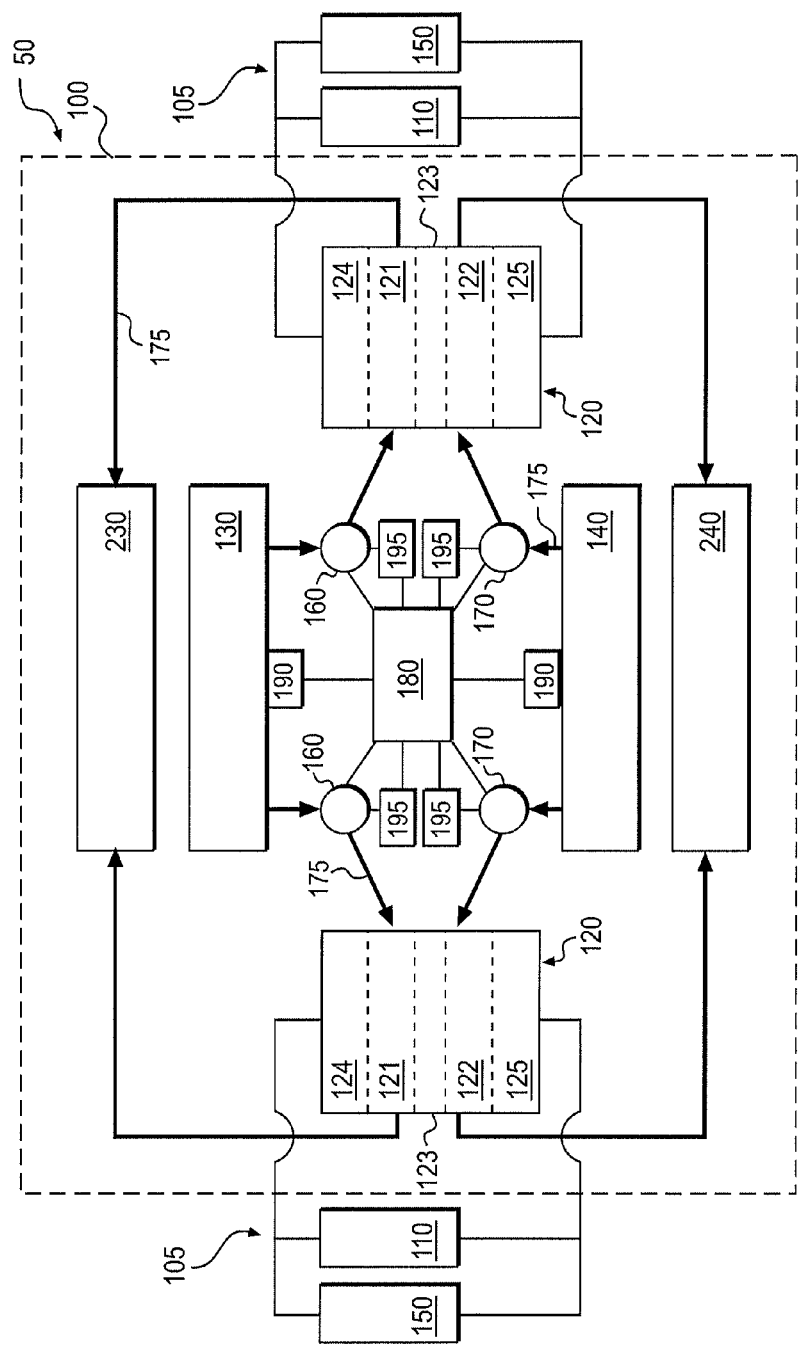
FIG. 3 is a block diagram of another exemplary embodiment of a flow battery system.

According to some embodiments, electrolyte tanks 130 and 140 may be configured to store only charged electrolytes. For example, FIG. 3 shows an exemplary embodiment of energy distribution system 50, which includes an exemplary flow battery system 100 having a plurality of uncharged electrolyte tanks 230 and 240. Uncharged electrolyte tanks 230 and 240 may be configured to receive uncharged electrolytes from at least one of reaction cells 120. For example, first uncharged electrolyte tank 230 may be configured to receive uncharged catholytes from at least one of the reaction cells 120. Alternatively, or additionally, second uncharged electrolyte tank 240 may be configured to receive uncharged anolytes from at least one of the reaction cells 120.

As shown in both FIGS. 2 and 3, exemplary flow battery systems 100 may also include at least one pump configured to pump fluid among reaction cells 120 and the first and second tanks 130 and 140. For example, flow battery system may include a pair of pumps 160 and 170 associated with at least one reaction cell 120. Pumps 160 and 170 may be configured to pump electrolytes from electrolyte tanks 130 and 140 to reaction cells 120 through conduits 175. For example, first pump 160 may pump positively charged electrolytes from electrolyte tank 130 through conduit 175 into half-cell 121 of reaction cell 120. In a similar manner, second pump 170 may be configured to pump negatively charged electrolytes from electrolyte tank 140 through conduit 175 into half-cell 122 of reaction cell 120.

According to some embodiments, a single pair of pumps 160 and 170 may supply electrolytes from tanks 130 and 140 to more than a single reaction cell 120, for example, via the use of valves and conduits (not shown) that provide selective flow paths between tanks 130 and 140 and a number of reaction cells. According to other embodiments, flow battery system 100 may include a second pair of pumps 160 and 170 configured to pump fluid between second reaction cell 120 and tanks 130 and 140. For example, third pump 160 may be configured to pump fluid between second reaction cell 120 and first tank 130, and fourth pump 170 may be configured to pump fluid between second reaction cell 120 and second tank 140.

According to some embodiments, electrolyte tanks 130 and 140 may be located separately from other components of energy distribution system 50. For example, as shown in FIG. 1, electrolyte tanks 130 and 140 may be shared by two or more locomotives 20, and electrolyte tanks 130 and 140 may be located separately from locomotives 20 on tender car 40. As locomotives 20 in consist 10 may be separated by multiple railcars, electrolyte tanks 130 and 140 may be stored separately from all locomotives 20 on one or more tender cars 40, for example, as shown in FIG. 1.

According to the exemplary embodiments shown in FIGS. 2 and 3, energy distribution system 50 may include a controller 180 configured to control the operation of at least one pump 160 based on a desired power supply to at least one power consumer 105. Controller 180 may embody a single microprocessor or multiple microprocessors that include a means for controlling the operation of pumps 160 and 170 and for communicating with loads 110 and/or power sources 150. Numerous commercially available microprocessors can be configured to perform the functions of controller 180. It should be appreciated controller 180 could readily embody a general machine or engine microprocessor capable of controlling numerous machine or engine functions. Controller 180 may include all the components required to run an application such as, for example, a memory, a secondary storage device, and a processor, such as a central processing unit or any other means known. Various other known circuits may be associated with controller 180, including power source circuitry (not shown) and other appropriate circuitry.

According to some embodiments, controller 180 may be configured to control the operation of one or more of pumps 160 and 170 to change the flow rates of fluid between first and second tanks 130 and 140 and reaction cell 120. This control may be based on, for example, the power needs of one or more of loads 110 and/or the power supply abilities of one or more of power sources 150. For example, for exemplary consist 10, traction motors 30 may act as a load on energy distribution system 50 when traction motors 30 propel consist 10 and/or as a power supply for embodiments of traction motor 30 that are configured to act as power generators when used to slow the speed of consist 10 during regenerative braking.

The power requirements of loads 110 may be understood in terms of electrical energy, and a correlation may exist between the electrical energy that reaction cells 120 may supply through electrodes 124 and 125 and the flow rates of one or more of pumps 160 and 170. This correlation may depend on a variety of factors, such as, for example, the average fluid energy density or the average electrode power density of the electrolytes. Other environmental factors may also affect this correlation, such as, for example, the temperature of flow battery system 100 and/or the capacity of pumps 160 and 170.

According to some embodiments, controller 180 may receive sensor data from a variety of sensors. For example, a plurality of electrolyte sensors 190 may communicate the charge levels of their corresponding electrolyte tanks 130 and 140. The charge levels of electrolyte tanks 130 and 140 may include the amount of charged electrolytes stored in electrolyte tanks 130 and 140. Additionally, or alternatively, the charge levels of electrolyte tanks 130 and 140 may be indicative of the total amount of energy stored in electrolyte tanks 130 and 140. In addition, energy distribution system 50 may also include one or more flow sensors 195 configured to provide signals to controller 180 indicative of the flow rate of electrolytes through conduits 175.

According to some embodiments, controller 180 may be configured to receive signals indicative of the magnitude of one or more of loads 110 and/or the magnitude of power supplied by one or more of power supplies 150, and control the operation of one or more pumps 160 and 170 based on those signals. Controller 180 may also be configured to receive signals from electrolyte sensors 190 indicative of the charge level of the electrolytes in one or more of electrolyte tanks 130, 140 and, based on signals indicative of the magnitude of loads 110 and/or power supplies 150, control operation of one or more pumps 160 and 170. In this exemplary manner, controller 180 may distribute the electrolytes in tanks 130 and 140 to meet the desired power outputs of the one or more loads 110 and/or capture the surplus power provided by power supplies 150. In this exemplary manner, energy supplied by power supplies 150 can be stored in tanks 130 and 140 and/or supplied to loads 110 to meet the desired power outputs of loads 110.

According to some embodiments, if one or more of traction motors 30 requires more power, controller 180 receives signals indicative of the desired power output of the one or more of traction motors 30, and signals indicative of the level of charge of the electrolytes in tanks 130 and 140 from electrolyte sensors 190, and determines the amount of electrolytes needed to meet the power output needs of traction motors 30. Thereafter, controller 180 controls operation of one or more of pumps 160 and 170 to provide appropriate flow rates of the electrolytes to reaction cells 120 associated with traction motors 30 via output of control signals to pumps 160 and 170.

According to some embodiments, the charge level of electrolytes may be increased as traction motors 30 act as generators when slowing consist 10. For example, the level of charge of electrolytes associated with traction motors 30 may be increased during power generation, and controller 180 may be configured to reverse the direction of one or more of pumps 160 and 170, so that electrolytes with enhanced charge levels may be pumped to one or more of tanks 130 and 140 for storage and later use. For example, controller 180 may be configured to control pump operation when power consumer 105 is configured to supply power to fluid in reaction cells 120. For example, controller 180 may be configured to control operation of first pump 160 so that a first portion of fluid in reaction cell 120 is pumped into first tank 130. Additionally, or alternatively, controller 180 may be configured to control operation of second pump 170 so that a second portion of fluid in reaction cell 120 is pumped into second tank 140.

Figure 4:
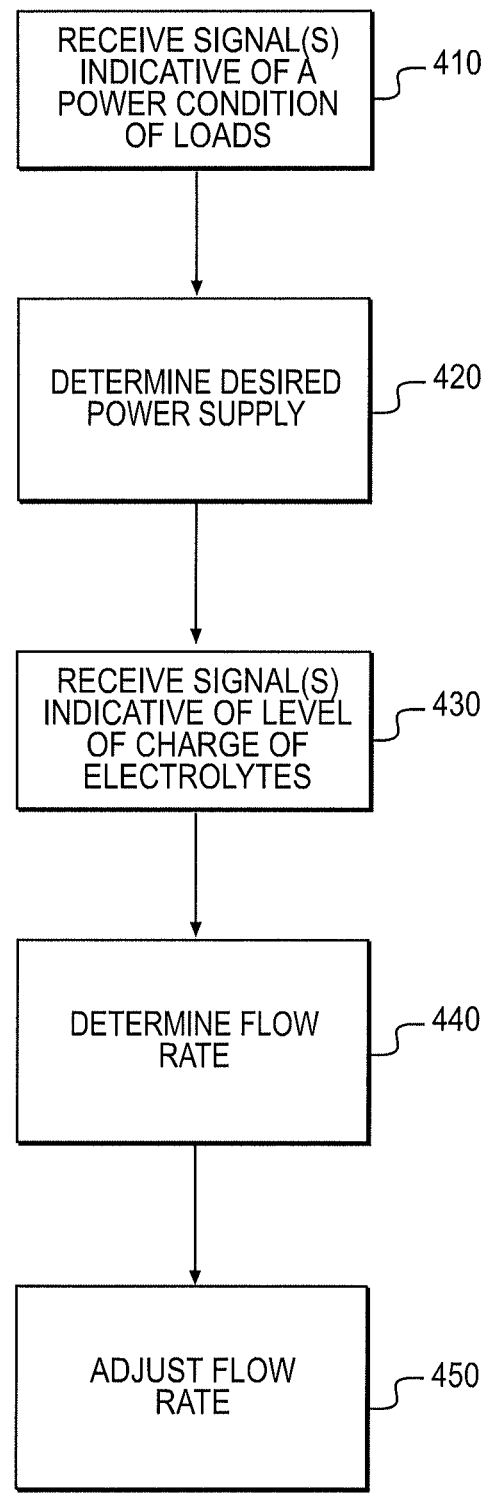
FIG. 4 is a flow diagram depicting an exemplary embodiment of a method of power distribution.

FIG. 4 is a flow diagram depicting an exemplary method of power distribution among a plurality of loads 110 sharing the electrolytes of at least one set of electrolyte tanks 130 and 140. At step 410, controller 180 may receive one or more signals indicative of a power condition of one or more of loads 110. The power condition may include the power consumption of load 110. Alternatively, or additionally, the power condition may include an operator input, such as a request for load 110 to operate at a higher capacity. In some embodiments, this may include a signal indicative of a change in locomotive speed. Alternatively, or additionally, the power condition may be indicative of the current or voltage drawn from reaction cells 120 by loads 110. In some embodiments, this power condition may be communicated by one or more sensors associated with loads 110. The power condition may optionally be indicative of other conditions of the power consumed by load 110.

At step 420, controller 180 may determine a desired power supply (e.g., output) for one or more of loads 110 based on the signals indicative of the power condition of loads 110. According to some embodiments, determining the desired power supply may be performed dynamically. This may be useful in situations in which the power requirements of loads 110 change depending on a variety of factors and conditions. The desired power output may optionally be determined once per the duration of the operation of load 110.

At step 430, controller 180 may receive one or more signals from electrolyte sensors 190 indicative of the level of charge of the electrolytes in tanks 130 and 140. These signals may be indicative of one or more of the volume and/or charge level of electrolytes in tanks 130 and 140. Based on the signals indicative of the power condition and the level of charge of the electrolytes in tanks 130 and 140, at step 440, controller 180 may be configured to determine a flow rate for at least one of the pumps 160 and 170 based on the desired power supply. For example, the determination at step 440 may include calculating a flow rate for each pump 160 and 170 to create the desired power output. The flow rate for each pump 160 and 170 may include a volume flow rate indicative of the rate at which a volume of the electrolytes should be delivered by pumps 160 and 170 to meet the desired power supply. In some embodiments, the flow rate may include a charge flow rate indicative of the amount of charge that should be delivered by pumps 160 and 170 over a period of time. The charge flow rate may vary as a function of the charge level or charge density of electrolytes in tanks 130 and 140. Additionally, or alternatively, the flow rate may include an energy flow rate indicative of the amount of energy that should be delivered by pumps 160 and 170 over a period of time. The flow rate determination in step 440 may take into consideration one or more of these types of flow rates.

The flow rate for each of pumps 160 and 170 may be understood as a function of the power output for each reaction cell 120, for example, depending on the level of charge of the electrolytes in tanks 130 and 140. The power requirements of loads 110 may be understood in terms of electrical energy. For example, a correlation (e.g., a ratio) may exist between the amount of electrical energy that reaction cell 120 may supply through electrodes 124 and 125 to loads 110, and the flow rate of provided by pumps 160 and 170. This correlation may depend on a variety of factors, such as, for example, the average fluid energy density and/or the average electrode power density of the electrolytes. Other environmental factors, such as the temperature of flow battery system 100 and the output capacity of pumps 160 and 170, may also affect this correlation. According to some embodiments, calculating the flow rates for pumps 160 and 170 may include determining the total amount of charged electrolytes available in electrolyte tanks 130 and 140. In applications in which all loads 110 require more power than the electrolytes can provide, calculating the flow rates may include determining a reduced proportion of the electrolytes that will be delivered to each of the reaction cells 120 associated with the respective loads 110.

Based on the determination of flow rate at step 440, at step 450, controller 180 adjusts the output of one or more of pumps 160 and 170 to supply the determined amount of electrolytes to reaction cells 120 from tanks 130 and 140. According to some embodiments, the flow rates supplied by pumps 160 and 170 may differ from each other. In addition, according to some embodiments, the direction of flow from the pumps 160 and 170 may be changed, for example, when power supplies 150 are supplying power to energy distribution system 50, resulting in charging the electrolytes in reaction cells 120. For example, traction motors 30 may operate as generators during regenerative braking, thereby charging electrolytes in reaction cells 120. Electrolytes charged in reactions cells 120 may be pumped to tanks 130 and 140 for storage and later use to supply power to loads 110, for example, in the exemplary manner described above.

According to some embodiments, controller 180 may be configured to determine when one or more of loads 110 changes into a power supply 150, for example, when traction motor 30 switches from drawing power from energy distribution system 50 to supplying power to the energy distribution system. Such a situation may occur when one or more of traction motors 30 transitions from propelling consist 10 to slowing consist 10 via regenerative braking Such a determination may be made when controller 180 receives signals from the operator or another subsystem of locomotive 20. The method may include changing the flow rates of pumps 160 and 170 in response to a change in power generation by power supplies 150. For example, in regenerative braking applications, as locomotive 20 continues to slow, the power generation of traction motors 30 may decline. The method may include changing the flow rates in response to this change in the rate at which power supply 150 generates power.

INDUSTRIAL APPLICABILITY

The disclosed systems and methods may provide a robust solution for increasing the efficiency (e.g., optimizing) the total power of a consist. In particular, the disclosed systems and methods may increase the power efficiency of electric and hybrid locomotives in consist configurations by managing the collective power requirements of the entire system, rather than managing power on the individual locomotive level.

The disclosed systems and methods may provide several advantages. For example, the locomotives within the consist may be able to share power they generate through regenerative braking with other locomotives in the consist. This may be particularly useful for situations in which a locomotive generates more regenerative braking power than can be stored within its own storage system. Also, there may be instances in which a locomotive uses comparatively less electrolytes during powering than it can recharge during regenerative braking. By sharing the generated power with other locomotives in the consist, the amount of power collectively generated by the locomotives can be distributed among the locomotives of the consist.

Additionally, maintenance of the flow battery system may be simplified. For example, when the electrolytes need to be replaced, fewer tanks need to be refilled. For example, for consists in which all the locomotives share one pair of tanks, only two tanks need to be refilled. This may decrease the downtime when the consist makes a maintenance stop, for example, on the way to a final destination.

Furthermore, a consist having locomotives that share electrolyte tanks may not need to carry as much electrolytes for a trip as a consist where each individual locomotive carries its own, self-contained supply of electrolytes. For example, for consists having self-contained electrolyte supplies, the sum of the maximum power requirements of each locomotive in a consist may exceed the total maximum power requirements of the consist itself. With an electrolyte tank system that may be shared by more than one locomotive of the consist, each locomotive need not prepare for its maximum power usage on a trip. This, combined with sharing of regenerated power, may significantly decrease the amount of electrolytes to be carried for a single trip.

It will be apparent to those skilled in the art that various modifications and variations can be made to the consist having shared electrolyte tanks and associated methods for operating the same. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for distributing energy among a plurality of power consumers, the system comprising:
    a plurality of reaction cells configured to receive electrolytes and provide electric power;
    a first tank configured to contain a supply of fluid including positively charged electrolytes;
    a second tank configured to contain a supply of fluid including negatively charged electrolytes;
    a first pump configured to pump fluid between the first tank and at least one of the reaction cells;
    a second pump configured to pump fluid between the second tank and the reaction cell; and
    a controller configured to:
        control operation of the first pump so that a first portion of fluid in the reaction cell is pumped to the first tank, and
        control operation of the second pump so that a second portion of fluid in the reaction cell is pumped to the second tank;
    wherein at least one of the power consumers is configured to supply power to fluid in the reaction cell.

2. The system of claim 1, wherein the controller is configured to control operation of the first and second pumps to change the flow rates of fluid between the first and second tanks and the reaction cell.

3. The system of claim 1, wherein the plurality of power consumers includes a first power consumer associated with the reaction cell and a second power consumer associated with a second reaction cell, and wherein the controller is configured to control operation of the first and second pumps to pump fluid between the reaction cell and the first and second tanks.

4. The system of claim 3, further including a second pair of pumps configured to pump fluid between the second reaction cell and the first and second tanks.

5. The system of claim 1, wherein the first tank includes a first tank separator for separating the positively charged electrolytes from discharged electrolytes, and the second tank includes a second tank separator for separating the negatively charged electrolytes from discharged electrolytes.

6. The system of claim 1, further including at least one uncharged electrolyte tank configured to receive uncharged electrolytes from at least one of the reaction cells.

7. A method of distributing energy among a plurality of power consumers sharing at least one pair of tanks configured to contain electrolytes, wherein at least one of the power consumers is associated with a reaction cell and a pair of pumps configured to pump the electrolytes between the pair of tanks and the reaction cell, the method comprising:
    receiving one or more signals indicative of a power condition of at least one of the plurality of power consumers;
    determining a desired power supply for the at least one of the plurality of power consumers based on the signals indicative of the power condition of the at least one power consumer;
    receiving one or more signals indicative of the level of charge of the electrolytes stored in the electrolyte tanks;
    determining a flow rate for a first pump of the pair of pumps based on the desired power supply; and
    controlling the first pump based on the determined flow rate.

8. The method of claim 7, further including:
    determining a desired power supply for a second of the plurality of power consumers based on signals indicative of a power condition of the second power consumer; and determining a second flow rate for a second pump of the pair of pumps based on the desired power supply for the second power consumer; and controlling the second pump based on the determined second flow rate.

9. The method of claim 7, wherein the signals indicative of the power condition of the at least one power consumer indicates that the at least one power consumer is supplying power to the reaction cell; and controlling operation of at least one of the pair of pumps so that electrolytes are pumped from the reaction cell to at least one of the tanks configured to contain electrolytes.

10. The method of claim 7, wherein determining the flow rate of the pump includes determining the amount of electrolytes available, and determining a proportion of the electrolytes to be supplied to a plurality of the reaction cells.

\* \* \* \* \*